Patented Dec. 18, 1951

2,579,416

UNITED STATES PATENT OFFICE 2,579,416

REACTION OF GASEOUS AMMONIA WITH HYDROCARBON SILICON HALIDES

Nicholas D. Cheronis, Chicago, Ill., assignor of one-third to Edwin L. Gustus, Chicago, Ill.

No Drawing. Application January 25, 1946, Serial No. 643,494

22 Claims. (Cl. 260—2)

My invention relates to a new method of preparation of silicon polymers. The object of my invention is a method of preparing organic silicon ammonia reaction products which are themselves resins or resin intermediates, or low-molecular-weight compounds which may be readily polymerized to give desirable resins. Silicone resins prepared by the hydrolysis of certain organic-substituted chlorosilanes have recently become of wide-spread interest due to their unusual properties. Compounds of unique and valuable properties are readily prepared by the interaction of hydrocarbon-substituted halosilanes and ammonia.

The reaction with ammonia and substituted ammonias, amines for instance, proceeds rapidly under almost all conditions. Marked advantages of control in the process and control of the finished product are conveniently attained by the use of gaseous ammonia reacting with the organic halosilanes under controlled conditions of temperature and concentration. As an example of my invention, the silicon ammonia compounds may be prepared by dissolving one or more of these halosilanes in a dry solvent, such as ether or xylene, and passing dry ammonia gas into the cooled solution, preferably stirring the solution vigorously during the addition of the ammonia. During the reaction the temperature and concentrations may be adjusted readily, and accordingly the degree of polymerization and rate of polymerization conveniently may be controlled, as may be desired.

The silanes are the tetravalent compounds of silicon in which the silicon acts analogously to carbon in conventional organic compounds, as may be expected from its position in the atomic table. The silanes which are useful in the preparation of my polymers are those in which at least one halogen atom is bonded to the silicon, and at least one organic carbon is bonded to each silicon, and are accordingly referred to as the organic halo-silanes. Because of economy of preparation, it is more expedient to use chlorosilanes rather than the other halosilanes, but, however, the limiting factor is the availability of the halosilane. The organic substituent may range from one or more methyl groups, up through mixtures of groups to those compounds in which the polymerizing ability of the silicon atom is dominated and blocked by the rest of the molecule. Substituted organic substituents may be used, limited only by the possibility of preparation, and the blocking action of active groups. For example, if a hydroxy group were present on the organic radical, it would normally react with the halogen atom present on the silicon before polymers could be formed. As is obvious to a skilled chemist, most radicals containing active hydrogen cannot be used as a substituent, because the silicon-linked halide would prematurely react to form hydrogen halide, which would prevent polymerization. Normally any organo-halo-silane which can be synthesized is satisfactory. Many halo-silanes may be prepared conveniently by the reaction of silicon halides upon a suitable Grignard reagent. Compounds may be used in which two Grignard functional groups are present, as,

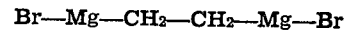

Br—Mg—CH$_2$—CH$_2$—Mg—Br which may give organo-di-silanes.

As an example, an experimental run was conducted in which 17 grams of commercial ethyl trichlorosilane was dissolved in 800 ml. of dry ether in a two-liter flask; the solution cooled in an ice-salt bath to approximately —10° to —15° C., and dry gaseous ammonia passed through the solution with stirring for a period of 45 min. The rate of introduction was such that more than the theoretical amount of ammonia necessary to react with all of the chlorine on the silicon was introduced during this period, the exact amount not being critical so long as an excess is present at the end, calculation being based on the replacement of the chlorine with —NH$_2$, and the formation of NH$_4$Cl. The reaction mixture as thus prepared was rapidly filtered by suction and the insoluble ammonium chloride was washed and pressed in the filter funnel first with dry ether and then with dry xylene. The combined filtrates were concentrated by distilling off the ether under reduced pressure until all ether was removed, the temperature not exceeding 40° C. The yield was 127 grams of solution containing 8.7% of solids, a total of 11.2 grams of resin-forming intermediate being thus obtained. The ammonium chloride removed was dissolved in water and gave 0.2 gram of an insoluble polymerized resin. The yield of desired product was about 95% of theoretical based on the replacement of all chlorine atoms with a —NH$_2$. The xylene solution contained an intermediate product which was readily polymerized by allowing the xylene to evaporate and the film to stand at room temperature for a period of an hour or less, when exposed in thin films, or faster if exposed to heat of 50° to 60° C.

The exact temperature and the concentrations during the reaction and during solvent removal determine the degree of polymerization which is obtained in the resin-forming product dissolved in the xylene. At very low temperatures and great dilutions practically pure monomer may be obtained, whereas at higher temperatures and with greater concentrations there is a tendency for polymerization to take place in the solution during its production. At room temperature and higher with certain halosilanes the degree of polymerization in the solution will be so great that precipitation of the resin will occur. The temperature to be used and the concentrations may be varied, dependent upon the halo-silane used and the degree of polymerization desired in the finished solution. A remarkably high yield of a very pure product of low molecular weight may be readily obtained in accordance with this invention. The degree of polymerization may be increased by heating and evaporating the xylene solution until the desired degree of polymerization is attained, at which point the solution may be cooled and diluted to stop the polymerization at the desired point.

A number of organic solvents may be used instead of xylene; any organic solvent which does not react with the halo-silanes, the ammonia or the finished resin, and which is liquid at the desired temperatures, is satisfactory. Among these may be mentioned ethyl ether, xylene, toluene, ligroin, higher and lower ethers, mixed ethers, cycloparaffins, or mixtures of the above. Carbon tetrachloride as the solvent lowers the yield, especially of aliphatic silanes. Acetone enters into the reaction and gives resins containing the acetone ammonia reaction products. It is desired that the mixture be stirred rapidly when the ammonia gas is being added, to prevent uneven local concentrations, and it is necessary that the temperature be sufficiently low that the resin intermediate of the particular halo-silane being used does not unduly polymerize in the solvent being used. The trichlorosilanes with mono-alkyl, aryl, etc., substituents give products which polymerize more rapidly than do the less chlorinated silanes. The product obtained from ethyl trichlorosilane will polymerize rapidly, smoothly and satisfactorily with or without the addition of plasticizers at room temperature to give a hard, smooth, clear resin. More highly substituted silanes, such as triethylchlorosilane, will give an oil nearly incapable of polymerization. By the choice of suitable halo-silanes and mixtures of silanes, a product of desired intermediate characteristics may be obtained. Typical of certain silanes which have been successfully used are the following:

1. Methyl trichlorosilane, which gives a hard, flexible resin after initial polymerization at room temperature.

2. Dimethyl dichlorosilane, which gives a volatile oil which will polymerize if evaporation is prevented. The oil can be copolymerized with the product from methyl trichlorosilane to plasticize the film produced.

3. Trimethylchlorosilane, which gives an oil which does not readily polymerize.

4. Ethyl trichlorosilane, which forms a resin, hard though flexible, at room temperature.

5. Diethyl dichlorosilane, which may give an oil which will evaporate without leaving a residue if polymerization is prevented during formation of the solution; however, a useful resin is formed when polymerization occurs.

6. N-propyl trichlorosilane, which yields a tacky residue after 1 hour at room temperature, but which forms a hard, flexible resin upon heating for 1 hour at 60° C.

7. Di-N-propyldichlorosilane, which forms an oily residue, and which forms a viscous, tacky resin at 100° C. and a hard, brittle film when heated at 180° C.

8. N-butyltrichlorosilane, which forms a hard, tough, flexible, clear resin at room temperature.

9. Isobutyltrichlorosilane, which forms a clear, flexible resin at room temperature.

10. Isoamyltrichlorosilane, which forms a tough, clear, hard resin at room temperature.

11. N-amyltrichlorosilane, which forms a tough, clear, hard resin at room temperature.

12. Phenyltrichlorosilane, which forms a hard, flexible resin at room temperature.

13. Diphenyldichlorosilane, which forms a tacky film at room temperature, but which forms a non-tacky hard resin when heated for 4 hours at 100° C. or 1 hour at 180° C.

Thus, generally speaking, synthetic polymeric resins characterized by repeating units of silicon linked to nitrogen as an integral part of the polymer chain may be obtained in accordance with my invention by the ammonolysis and condensation of a tri-functional or di-functional organo-silane, that is of a silane of the general formula

wherein R is a monovalent hydrocarbon radical, Hal is a halogen atom, and $n$ is an integer between 1 and 2, inclusive.

14. Benzyltrichlorosilane, which forms a tough, clear, hard resin at room temperature.

15. Dibenzyl dichlorosilane, which forms a tacky film at room temperature, but which cures to a hard resin when heated at 100° C. for 4 hours, or 1 hour at 180° C.

16. Para-chlorophenyl trichlorosilane, which forms a hard, brittle resin at room temperature.

17. Alpha-naphthyl silicon trichloride, which rapidly forms a brittle resin at room temperature.

Certain mixtures give very satisfactory resins with properties intermediate between those of their components; for example, a mixture of 12.6 grams of diethyl dichlorosilane and 3.5 grams of ethyl trichlorosilane gave an oil which hardened into a flexible film at 100° C. A mixture of 7.9 grams of diethyl dichlorosilane and 8.2 grams of ethyl trichlorosilane gave a tacky film at room temperature which hardened when heated to 100° C. A mixture of 3.2 grams of diethyl dichlorosilane and 13.1 grams of ethyl trichlorosilane gave a hard, flexible film at room temperature and which remained as a flexible film up to 450° C. This film is particularly efficacious as a heat-resisting film. A mixture of 8 grams of methyl trichlorosilane and 8 grams of diethyl dichlorosilane gave an oil at room temperature which polymerized to a hard, thin, flexible film at 180° C. A mixture of 2 grams of methyl trichlorosilane and 3 grams of ethyl trichlorosilane and 10 grams of diethyl dichlorosilane gave an oil which polymerized to a soft, flexible film at 180° C.

N-hexyl trichlorosilane formed a soft, flexible resin at room temperature which became brittle when heated to 450° C. Dimethyl dichlorosilane gave an oil which evaporated, when heated, without leaving a residue.

The results obtained by using an aqueous ammonia solution are entirely different than by using dry ammonia vapor, as the water present apparently reacts to give hydroxyl substitution rather than amino substitution on the silicon.

Care must be exercised, when preparing the organo-silicon ammonia compounds, that water is not introduced into the system, as hydrolysis will occur faster than ammonolysis, giving different products. A mixture of silicon ammonia compounds and the silicone compounds yield useful resins and may be used if so desired, but the peculiar advantages of the ammonia-substituted compounds are not as striking in the presence of the products of hydrolysis of the halosilanes.

I claim:

1. The process which comprises reacting a compound of the general formula $$R_nSiHal_{(4-n)}$$

wherein R is a monovalent hydrocarbon radical, Hal is a halogen atom, and $n$ is an integer from 1 to 2 inclusive, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

2. The process which comprises reacting a compound of the general formula $$RSiHal_3$$

wherein R is a monovalent hydrocarbon radical and Hal is a halogen atom, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

3. The process which comprises reacting a compound of the general formula $$RR'SiHal_2$$

wherein R and R' are monovalent hydrocarbon radicals not necessarily the same, and Hal is a halogen atom, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

4. The process which comprises reacting a compound of the general formula $$R_nSiHal_{(4-n)}$$

wherein R is a monovalent hydrocarbon radical, Hal is a halogen atom, and $n$ is an integer from 1 to 2 inclusive, with gaseous ammonia in an amount in excess of that required to replace all the halogen attached to the silicon of the first-named compound and convert said halogen to ammonium halide, below room temperature in the presence of an inert solvent and in the absence of water to produce a solution of a polymeric substance characterized by repeating units of silicon linked to nitrogen as an integral part of the polymer chain, and removing said solvent to produce a resin characterized by repeating units of silicon linked to nitrogen as an integral part of the polymer chain.

5. The process which comprises reacting a compound of the general formula $$RSiHal_3$$

wherein R is a monovalent hydrocarbon radical and Hal is a halogen atom, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain, and removing said solvent to produce a resin characterized by repeating units of silicon linked to nitrogen as an integral part of the polymer chain.

6. The process which comprises reacting a compound of the general formula $$RR'SiHal_2$$

wherein R and R' are monovalent hydrocarbon radicals not necessarily the same, and Hal is a halogen atom, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain, and removing said solvent to produce a resin characterized by repeating units of silicon linked to nitrogen as an integral part of the polymer chain.

7. The process which comprises reacting a compound of the general formula $$R_nSiCl_{(4-n)}$$

wherein R is a monovalent hydrocarbon radical and $n$ is an integer from 1 to 2 inclusive, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

8. The process which comprises reacting a compound of the general formula $$R_nSiCl_{(4-n)}$$

wherein R is a monovalent hydrocarbon radical and $n$ is an integer from 1 to 2 inclusive, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain, and removing said solvent to produce a resin characterized by repeating units of silicon linked to nitrogen as an integral part of the polymer chain.

9. The process which comprises reacting a compound of the general formula $$R_nSiHal_{(4-n)}$$

wherein R is an alkyl radical, Hal is a halogen atom, and n is an integer from 1 to 2 inclusive, with gaseous ammonia in an amount in excess of that required to replace all the halogen attached to the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

10. The process which comprises reacting a compound of the general formula $$R_nSiHal_{(4-n)}$$

wherein R is an alkyl radical, Hal is a halogen atom, and n is an integer from 1 to 2 inclusive, with gaseous ammonia in an amount in excess of that required to replace all the halogen attached to the silicon to the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain, and removing said solvent to produce a resin characterized by repeating units of silicon linked to nitrogen as an integral part of the polymer chain.

11. The process which comprises reacting ethyltrihalosilane with gaseous ammonia in excess of that required to replace all the halogen attached to silicon, below room temperature in the presence of an inert solvent and in the absence of water to produce a solution of a polymeric substance characterized by repeating units of silicon linked to nitrogen as an integral part of the polymer chain.

12. The process which comprises reacting ethyltrichlorosilane with gaseous ammonia in excess of that required to replace all the chlorine attached to silicon, at about —10° C. in the presence of ether and in the absence of water to produce a solution of a polymeric substance characterized by repeating units of silicon linked to nitrogen as an integral part of the polymer chain.

13. The process which comprises reacting diethyldihalosilane with gaseous ammonia in excess of that required to replace all the halogen attached to silicon, below room temperature in the presence of an inert solvent and in the absence of water to produce a solution of a polymeric substance characterized by repeating units of silicon linked to nitrogen as an integral part of the polymer chain.

14. The process which comprises reacting diethyldichlorosilane with gaseous ammonia in excess of that required to replace all the chlorine attached to silicon, below room temparture in the presence of an inert solvent and in the absence of water to produce a solution of a polymeric substance, and removing said solvent to produce a resin characterized by repeating units of silicon linked to nitrogen as an integral part of the polymer chain.

15. The process which comprises reacting a compound of the general formula $$R_nSiHal_{(4-n)}$$

wherein R is a monovalent aryl radical, Hal is a halogen atom and n is an integer from 1 to 2 inclusive, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

16. The process which comprises reacting a compound of the general formula $$RR'SiHal_2$$

wherein R and R' are monovalent hydrocarbon radicals not necessarily the same, at least one of said monovalent hydrocarbon radicals being an aryl radical, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

17. The process which comprises reacting diphenyl dichlorosilane with gaseous ammonia in excess of that required to replace all the chlorine attached to silicon, below room temperature in the presence of an inert solvent and in the absence of water to produce a solution of a polymeric substance, and removing said solvent to produce a resin characterized by repeating units of silicon linked to nitrogen as an integral part of the polymer chain.

18. The process which comprises reacting a mixture of compounds of the general formulae $$RSiHal_3 \text{ and } R_2SiHal_2$$

wherein R are monovalent hydrocarbon radicals not necessarily the same and Hal is a halogen atom, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain.

19. The process which comprises reacting a mixture of compounds of the general formulae $$RSiHal_3 \text{ and } R_2SiHal_2$$

wherein R are monovalent hydrocarbon radicals not necessarily the same and Hal is a halogen atom, with gaseous ammonia in an amount in excess of that required to replace all the halogen attached to the silicon of the first-named compound and convert said halogen to ammonium halide, below room temperature in the presence of an inert solvent and in the absence of water, to produce a solution of a polymeric substance characterized by repeating units of silicon linked to nitrogen as an integral part of the polymer chain, and removing said solvent to produce a resin characterized by repeating units of silicon linked to nitrogen as an integral part of the polymer chain.

20. The process which comprises reacting a mixture of ethyltrichlorosilane and diethyldichlorosilane with gaseous ammonia in excess of that required to replace all the chlorine attached to silicon, below room temperature in the presence of an inert solvent and in the absence of water to produce a solution of a polymeric substance characterized by repeating units of silicon linked to nitrogen as an integral part of the polymer chain.

21. The method of forming a polymeric product, comprising reacting anhydrous gaseous ammonia with a mono-organosilicontrihalide in which the organic radical is a monovalent hydrocarbon radical, in the absence of water.

22. The method of forming a polymeric product, comprising reacting anhydrous gaseous ammonia with a mono-organosilicontrihalide in which the organic radical is a monovalent alkyl radical, in the absence of water.

NICHOLAS D. CHERONIS.

REFERENCES CITED

The following references are of record in the file of this patent:

UNITED STATES PATENTS

| Number | Name | Date |
|---|---|---|
| 2,265,962 | Bent et al. | Dec. 9, 1941 |
| 2,412,470 | Norton | Dec. 10, 1946 |
| 2,462,635 | Haber | Feb. 22, 1949 |

OTHER REFERENCES

Stock et al.: Berichte Deut. Chem. Gesel., vol. 156, 1923, pp. 986 to 994.

Sauer: Journ Amer. Chem. Soc., vol. 66, 1944, pp. 1707 to 1710.

Stock et al.: Hydrides of Boron and Silicon, Cornell U. Press, 1933, pp. 30 and 31.